United States Patent [19]

Devienne

[11] Patent Number: 4,512,538
[45] Date of Patent: Apr. 23, 1985

[54] DEVICE FOR MAINTAINING A DETONATING CORD AGAINST A TRANSPARENT AIRCRAFT CANOPY MEMBER

[75] Inventor: Jules H. P. Devienne, Sartrouville, France

[73] Assignee: Societe Nationale Industrielle et Aerospatiale, Paris, France

[21] Appl. No.: 470,944

[22] Filed: Mar. 1, 1983

[30] Foreign Application Priority Data

Mar. 4, 1982 [FR] France ................ 82 03609

[51] Int. Cl.³ .......................................... B64D 25/08
[52] U.S. Cl. ............................ 244/122 AF; 89/1.14
[58] Field of Search ................. 244/122 AF, 122 AE, 244/121; 102/275.7, 275.8, 378; 89/1 B

[56] References Cited

U.S. PATENT DOCUMENTS

| | | | |
|---|---|---|---|
| 3,342,133 | 9/1967 | Strom et al. | 102/275.7 |
| 3,778,010 | 12/1973 | Potts et al. | 244/122 AF |
| 4,011,816 | 3/1977 | Smith et al. | 102/275.8 |
| 4,312,272 | 1/1982 | Baker et al. | 102/275.8 |

Primary Examiner—Galen L. Barefoot
Attorney, Agent, or Firm—Oblon, Fisher, Spivak, McClelland & Maier

[57] ABSTRACT

Device for maintaining a detonating cord against a transparent aircraft canopy member which is of the type comprising a closed sheath within which is placed the cord. The device also has an outer envelope, whereof a first part, surrounded by the closed sheath, is maintained against the transparent member and whereof a second part is fixed to a structural component of the aircraft cockpit.

12 Claims, 2 Drawing Figures

DEVICE FOR MAINTAINING A DETONATING CORD AGAINST A TRANSPARENT AIRCRAFT CANOPY MEMBER

BACKGROUND OF THE INVENTION

The present invention relates to a device for maintaining a detonating cord against a transparent aircraft canopy member in order to ensure the cutting out and ejection of the latter.

Numerous pyrotechnic devices exist for the breaking of the aircraft glass and/or transparent material, which permit much faster cutting and evacuation than conventional evacuation or abandonment systems, such as the mechanical release of the canopy.

An example of such pyrotechnic evacuation systems is described in French Pat. No. 2 121 843 which relates to an evacuation system in which the glass is broken by means of a detonating cord placed within an elastomer sheath, itself held against one of the faces of the canopy by a system of support or retaining plates. On the canopy side the sheath is open and the plates must be made from spring steel. Without using an adhesive, they make it possible to maintain the detonating cord against the transparent canopy member, by exerting on the latter a given pressure per unit length of cord and this is independent of temperature variations. These plates must also be provided with saw marks, which are regularly spaced for their arrangement in the cockpit and reinforcing plates are also necessary. The use of spring steel plates is highly disadvantageous from the weight standpoint in the case of cockpits for unpressurized light aircraft. Furthermore, the maintaining of the detonating cord in a flexible sheath, open on the side which bears on the transparent member fails to protect, if the aircraft crashes, the rescuers from projected molten lead and pieces of transparent members projected at high velocities. Finally, in the case of ejection during flight, the sheaths which are no longer maintained in place, may be prejudicial to the movements of the crew and may compromise a rapid abandoning of the aircraft.

SUMMARY OF THE INVENTION

The present invention relates to a device for maintaining a detonating cord against a transparent aircraft canopy member, which obviates these disadvantages by ensuring an effective cutting out of the canopy, whilst protecting the crew from accidental projections of molten lead or pieces of the transparent member.

According to the main feature of the device according to the invention, which is of the type comprising a closed sheath within which is placed the cord, the device also has an outer envelope, whereof a first part, entirely surrounding the closed sheath, is maintained against the transparent member and whereof a second part is fixed to a structural component of the aircraft cockpit.

This arrangement enables the envelope surrounding the sheath containing the cord to act as a gas generator, thus aiding a very low speed ejection of the transparent member, whilst confining the detonation products. Thus, the system represents no danger, either inside or outside the aircraft cockpit.

According to another feature of this device, the aircraft cockpit structural member is a longeron, whose cross-section is shaped in such a way that it defines a first surface forming a dihedral angle with the surface of the transparent member, the part of the outer envelope surrounding the closed sheath being kept against both the transparent member and the first surface, as well as a second surface to which is fixed the second part of the outer envelope.

According to a preferred embodiment, the outer envelope has a first part having a substantially circular cross-section and a second part in the form of a flat tongue fixed to the aircraft cockpit structural component.

The outer envelope is preferably made from a cloth impregnated with silicone and polymerized.

BRIEF DESCRIPTION OF THE DRAWINGS

The invention is described in greater detail hereinafter relative to non-limitative embodiments and the attached drawings, wherein show.

DETAILED DESCRIPTION OF THE INVENTION

Figure 1:
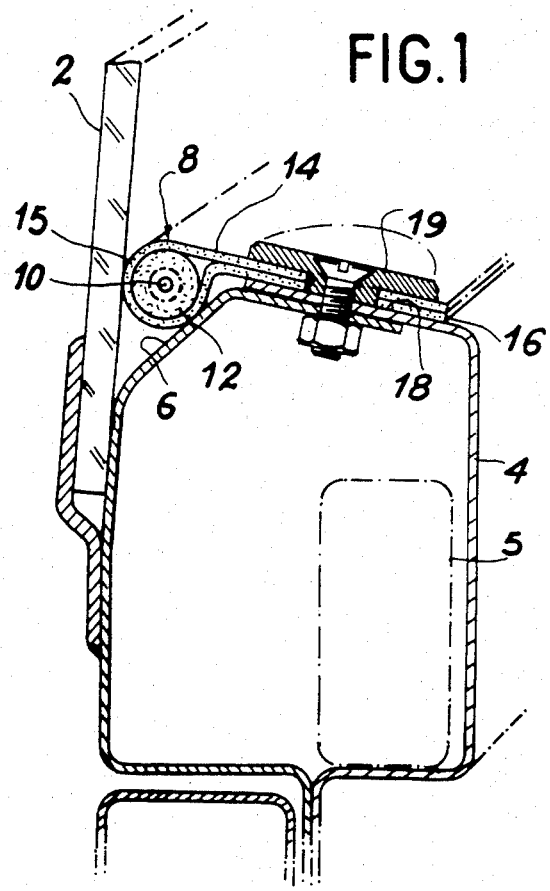
FIG. 1 a diagrammatic sectional view of the preferred arrangement of the device according to the invention bearing against a transparent aircraft canopy member.

FIG. 1 shows the transparent canopy member 2 against which is placed, from the inside, a longeron 4. The latter is in the form of a tube having a polygonal section, whereof one of the faces 6 forms a dihedron angle with the surface of the transparent member 2. In this angle is positioned the device for maintaining the detonating cord according to the invention and which carries the reference numeral 8. It can be seen that the detonating cord 10 is placed within a closed elastomer sheath 12 having a circular cross-section and which is entirely surrounded by an outer envelope 14, preferably made of cloth. In the presently described embodiment, the outer envelope is constituted by a silicone-impregnated and polymerized cloth, whereof a first part 15 which has a circular cross-section, surrounds the closed sheath 12 and whose edges have been joined so as to form a tongue 16. Longeron 4 has a face 18, differing from face 6 referred to hereinbefore, to which is fixed the tongue 16 of the outer envelope 14 with the aid of a cover strip 19. This arrangement makes it possible to maintain the tongue 16 against longeron 4 and also maintain part 15 of envelope 14 both against transparent member 2 and against the first face 6 of the longeron 4.

Figure 2:
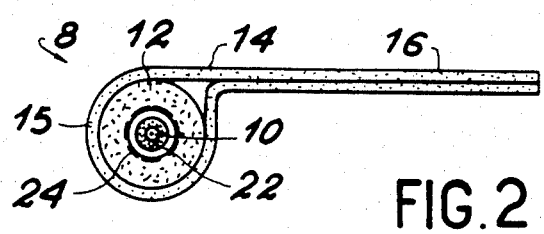
FIG. 2 a diagrammatic sectional view showing in greater detail the construction of the device according to the invention.

FIG. 2 shows in greater detail the arrangement of the detonating cord 10, still line 23, within the outer envelope 14. It is possible to see the detonating cord 10 surrounded by a lead coating 22, enclosed in an inner Teflon envelope 24. The latter is placed within the closed sheath 12, which is made for example from silicone rubber. It is also possible to see outer envelope 14, whereof a part 15 having a circular cross-section surrounds the closed sheath 12, whilst its two edges have been joined to form tongue 16, which is applied to face 18 of longeron 4. The use of a cloth makes it possible to limit the elasticity of the elastomer and contributes to the linear maintaining in place of closed sheath 12 enclosing the cord.

On referring once again to FIG. 1, it can be seen that at certain points longeron 4 can be given a sufficiently large cross-section to house a firing pin or device 5. During firing, a detonation wave traverses detonating cord 10 and produces an energy quantity instantaneously transmitted to closed sheath 12 applied along the canopy transparent member, which leads to the fracture of the latter. Cover strip 19 makes it possible to maintain the pyrotechnic transmission chain against the transparent member 2. This arrangement improves the protection of the crew against the risks of injury by shattered and projected parts of various types, the silicone rubber sheath preventing projections of molten lead, because the elasticity of the material enables the same to inflate during the detonation without breaking.

The device according to the invention has particularly interesting advantages, because it makes it possible to eject the transparent member at a very low speed, whilst confining the detonation product. There is no risk of the projection of molten lead or other detonation products, either outside or inside the cockpit. For example, if the aircraft crashes on the ground and the crew is unable to act, rescuers can actuate the firing pin 5 with the aid of a handle located outside the aircraft, without having to fear projections of molten lead or pieces of transparent member projected at high speeds. Finally, the outer envelope 14 maintains the detonating cord in place, whilst insulating it from the vibrations of the aircraft. In addition, the arrangement ensures the immobilization of the cutting chain along the longeron 4, both before and particularly after firing.

What is claimed is:

1. A device for maintaining a detonating cord against a transparent aircraft canopy member, said device comprising a closed sheath within which is placed the detonating cord, an outer envelope, whereof a first part, entirely surrounding the closed sheath, is maintained against the transparent member and whereof a second part is fixed to a longeron the cross-section of which is shaped in such a way that it defines a first surface forming a dihedral angle with the surface of the transparent canopy member, the part of the outer envelope surrounding the closed sheath being kept against both the transparent canopy member and the first surface, as well as a second surface, to which is fixed the second part of the outer envelope.

2. A device according to claim 1, wherein the first part of the outer envelope has a substantially circular cross-section and the second part of the outer envelope is in the form of a flat tongue fixed to the longeron.

3. A device according to claim 1, wherein the outer envelope is made from a silicone-impregnated and polymerized cloth.

4. A device according to claim 1, wherein the closed sheath is made from elastomer.

5. A device according to claim 1, wherein the detonating cord is placed within a lead mass surrounded by an inner envelope, which is itself arranged within the closed sheath.

6. A device according to claim 5, wherein the inner envelope is made from Teflon.

7. A device for maintaining a detonating cord in position between a transparent aircraft canopy member and a longeron located adjacent to and on the inside of the transparent aircraft canopy member, the longeron having a first surface which forms a dihedral angle with an inside surface of the transparent aircraft canopy member and a second surface which joins the first surface along a line spaced from the transparent aircraft canopy member, said device comprising:
 (a) a detonating cord;
 (b) a closed sheath surrounding said detonating cord;
 (c) an outer envelope surrounding said closed sheath, said outer envelope comprising:
  (i) a first part which entirely surrounds said closed sheath and which is maintained between and lodged against both the inside surface of the transparent aircraft canopy member and the first surface of the longeron and
  (ii) a second part which extends from the first part of said outer envelope and which is fixed to the second surface of the longeron.

8. A device as recited in claim 7 wherein:
 (a) the first part of said outer envelope has an at least substantially circular cross-section and
 (b) the second part of said outer envelope is in the form of a flat tongue fixed to the longeron.

9. A device as recited in claim 7 wherein said outer envelope is made from a silicone-impregnated and polymerized cloth.

10. A device as recited in claim 7 wherein said closed sheath is made from elastomer.

11. A device as recited in claim 7 wherein:
 (a) said detonating cord is placed within a lead mass;
 (b) said lead mass is surrounded by an inner envelope; and
 (c) said inner envelope is placed within said closed sheath.

12. A device as recited in claim 11 wherein said inner envelope is made from Teflon.

* * * * *